(12) United States Patent
Shan et al.

(10) Patent No.: US 11,660,662 B2
(45) Date of Patent: May 30, 2023

(54) INTERLAYER PRE-COOLING APPARATUS FOR SAND MOLD FREEZING PRINTING

(71) Applicant: NANJING UNIVERSITY OF AERONAUTICS AND ASTRONAUTICS, Nanjing (CN)

(72) Inventors: Zhongde Shan, Nanjing (CN); Haoqin Yang, Nanjing (CN); Jianpei Shi, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/918,347

(22) PCT Filed: Jun. 15, 2022

(86) PCT No.: PCT/CN2022/098841
§ 371 (c)(1),
(2) Date: Oct. 12, 2022

(87) PCT Pub. No.: WO2023/005473
PCT Pub. Date: Feb. 2, 2023

(65) Prior Publication Data
US 2023/0121449 A1    Apr. 20, 2023

(30) Foreign Application Priority Data

Jul. 28, 2021  (CN) .......................... 202110859399.9

(51) Int. Cl.
*B22C 9/02*         (2006.01)
*B33Y 30/00*        (2015.01)
(Continued)

(52) U.S. Cl.
CPC ................ *B22C 9/02* (2013.01); *B28B 1/001* (2013.01); *B33Y 30/00* (2014.12); *B33Y 40/00* (2014.12)

(58) Field of Classification Search
CPC .................................. B22C 9/02; B33Y 30/00
See application file for complete search history.

(56) References Cited

FOREIGN PATENT DOCUMENTS

| CN | 104985116 A | 10/2015 |
|----|-------------|---------|
| CN | 111070375 A | 4/2020  |

(Continued)

*Primary Examiner* — Kevin E Yoon
(74) *Attorney, Agent, or Firm* — Bayramoglu Law Offices LLC

(57) ABSTRACT

An interlayer pre-cooling apparatus for a sand mold freezing printing includes a sand paving apparatus. The sand paving apparatus is located above a negative-pressure low-temperature forming chamber, and the sand paving apparatus includes several independent sand paving grooves, a hollow sand paving roller, a cooling chamber, a sand scraping plate, and an openable and closable baffle. The openable and closable baffle is rotationally arranged at a discharge port of each sand paving apparatus, and the openable and closable baffle is used for paving low temperature premixed sand on demand. The premixed molding sand is further cooled during the process of scraping and compacting low-temperature molding sand. When the apparatus is adopted for sand mold freezing 3D printing, the low temperature of the premixed molding sand is precisely controllable, which has great significance for realizing interlayer pre-cooling of the sand mold freezing printing.

8 Claims, 1 Drawing Sheet

(51) Int. Cl.
  *B28B 1/00* (2006.01)
  *B33Y 40/00* (2020.01)

(56) References Cited

FOREIGN PATENT DOCUMENTS

| | | |
|---|---|---|
| CN | 211938928 U | 11/2020 |
| CN | 112077262 A | 12/2020 |
| CN | 113547076 A | 10/2021 |
| FR | 3083472 A1 * | 1/2020 ............... B22C 1/02 |
| JP | 2012071349 A | 4/2012 |
| JP | 2017056482 A | 3/2017 |

* cited by examiner

INTERLAYER PRE-COOLING APPARATUS FOR SAND MOLD FREEZING PRINTING

CROSS REFERENCE TO THE RELATED APPLICATIONS

This application is the national phase entry of International Application No. PCT/CN2022/098841, filed on Jun. 15, 2022, which is based upon and claims priority to Chinese Patent Application No. 202110859399.9, filed on Jul. 28, 2021, the entire contents of which are incorporated herein by reference.

TECHNICAL FIELD

The present invention relates to the technical field of 3D printing manufacturing capable of implementing a frozen sand mold with high dimensional precision, and relates to an interlayer pre-cooling apparatus for a sand mold freezing printing.

BACKGROUND

Sand mold 3D printing technology is a rapid prototyping technology mainly based on a principle of micro-droplet spray. Frozen sand mold 3D printing uses a water-based solution as a blinder for sand mold casting. The premixed sand is frozen into a solid layer by layer in a low temperature environment to maintain its shape, which is different from other 3D printing technologies that print materials at room temperature or heating. Frozen sand mold naturally collapses under the impact of high temperature melt, and no strong irritating gas is generated during a pouring process. Resin is not used in this method, and the main component of the binder is water, which plays a role of environmental protection and complies with a concept of modern green manufacturing.

In the process of micro-droplet spraying pure water freezing bonded molding sand, the sand paving process has an important influence on the normal operation of a device and the forming quality of a casting.

As shown in FIG. 1, a current sand mold freezing printing apparatus includes a vacuum feeding apparatus (1), a sand mixing apparatus (2), a sand paving apparatus (3), an array nozzle (4), and a negative-pressure low-temperature forming chamber (5), where the vacuum feeding apparatus (1) is located above the sand paving apparatus (3) and is connected to a feeding port of the sand mixing apparatus (2), and the sand paving apparatus (3) is located above the negative-pressure low-temperature forming chamber (5); a three-dimensional motion system (7) is located above the negative-pressure low-temperature forming chamber (5); the array nozzle (4) is slidably arranged on the three-dimensional motion system (7) through a first servo motor, so that movement in the direction of three degrees of freedom may be implemented; the array nozzle (4) is used for spraying pure water on demand to solidify the sand mold; and the sand paving apparatus (3) is slidably connected to the three dimensional motion system (7) through a second servo motor.

It is difficult for a conventional sand paving apparatus to ensure that the temperature of the premixed sand is controlled in the range of −40° C. to −10° C. by using an ordinary sand paving roller or sand scraping plate, thereby affecting forming precision of nozzle printing. In addition, low-temperature molding sand premixed with dry ice or liquid nitrogen also has problems of poor flatness and non-uniform density in a sand paving process, so that the precision of shape and size of frozen casting mold and basic performance of the casting are affected.

SUMMARY

In order to solve the described problems, the present invention discloses an interlayer pre-cooling apparatus for a sand mold freezing printing, and the apparatus mainly solves the problems of poor flatness, non-uniform density, interlayer pre-cooling, etc., in the sand paving process of low-temperature premixed sand.

To achieve the above purpose, the present invention is achieved through the following technical solutions:

An interlayer pre-cooling apparatus for a sand mold freezing printing, it comprises a sand paving apparatus, wherein the sand paving apparatus is located above a negative-pressure low-temperature forming chamber, and the sand paving apparatus comprises several independent sand paving grooves, a hollow sand paving roller, a cooling chamber, a sand scraping plate, and an openable and closable baffle; the openable and closable baffle is rotationally arranged at a discharge port of each sand paving groove, and the openable and closable baffle is used for paving low temperature premixed sand on demand.

A further improvement of the present invention is: the openable and closable baffle is located below the sand paving groove, and sand paving is performed on demand by opening and closing the openable and closable baffle under the control of a control system; the sand scraping plate is arranged beside the openable and closable baffle, and is used for once scraping the molding sand discharged from the sand paving groove; the inner cavity of the hollow sand paving roller is hollow, and the sand scraping plate is connected and fixed to the cooling chamber, wherein the hollow sand paving roller is located in the cooling chamber and one end thereof is connected and fixed to the sand scraping plate through a connecting rod, and the hollow sand paving roller is used for secondary scraping and pressure compaction of the molding sand.

A further improvement of the present invention is: one end of the openable and closable baffle is connected and fixed to the sand paving groove through a return spring.

A further improvement of the present invention is: dry ice and liquid nitrogen may be passed into the hollow sand paving roller to control the surface temperature of the sand paving roller at −40° C. to −10° C..

A further improvement of the present invention is: the dry ice and the liquid nitrogen may be passed into the inner cavity of the cooling chamber.

A further improvement of the present invention is: the openable and closable baffle satisfies that premixed molding sand flows out of the sand outlet smoothly, an inclination angle of the openable and closable baffle is 60°, and the width of the sand outlet is 6 mm.

A further improvement of the present invention is: the openable and closable baffle is connected to a spiral drive motor through a rotary pin shaft; or controls an opening and closing angle with a rotary cylinder to perform sand paving on demand though the rotary pin shaft.

A further improvement of the present invention is: a vibration motor is installed in the sand paving apparatus to prevent deformation and bonding of the premixed molding sand.

Beneficial effects of the present invention:

(1) according to the present solution, a premixed molding sand is paved at a low temperature by means of a hollow sand paving roller with a built-in refrigerant, a cooling chamber, and a sand scraping plate, thereby achieving an interlayer pre-cooling effect of temperature control in the sand paving process, improving the forming precision of a printing nozzle, and further improving the precision of shape and size of a frozen casting mold and basic performance of a casting.

(2) the sand mold forming process is in an environment of negative pressure and low temperature, and the compactness of the molding sand is improved, so that the influence of external environmental pressure and temperature on the printing process is reduced.

Figure 1:
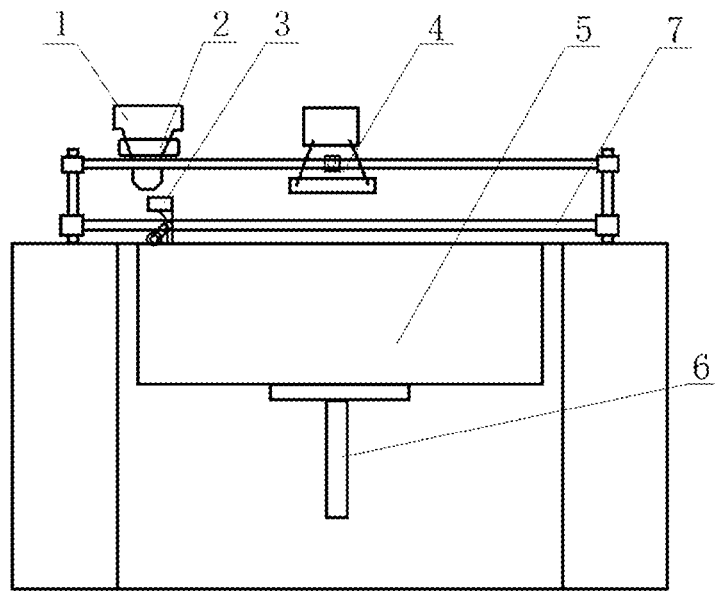
FIG. 1 is a background art drawing.

LIST OF REFERENCE SIGNS 1-vacuum feeding apparatus, 2-sand mixing apparatus, 3-sand paving apparatus, 4-array nozzle, 5-negative-pressure low-temperature forming chamber, 6-liftable workbench, 7-three-dimensional motion system, 8-hollow sand paving roller, 9-cooling chamber, 10-sand scraping plate, 11-sand paving groove, and 12-openable and closable baffle.

DETAILED DESCRIPTION OF THE EMBODIMENTS

The present invention is further illustrated below in conjunction with the drawings and specific embodiments, and it should be understood that the following specific embodiments are merely used to illustrate the present invention and not to limit the scope of the present invention. It should be noted that the words "front", "back", "left", "right", "upper", and "lower" used in the following description refer to directions in the drawings, and the words "inner" and "outer" respectively refer to directions toward or away from the geometric center of a particular component.

Figure 2:
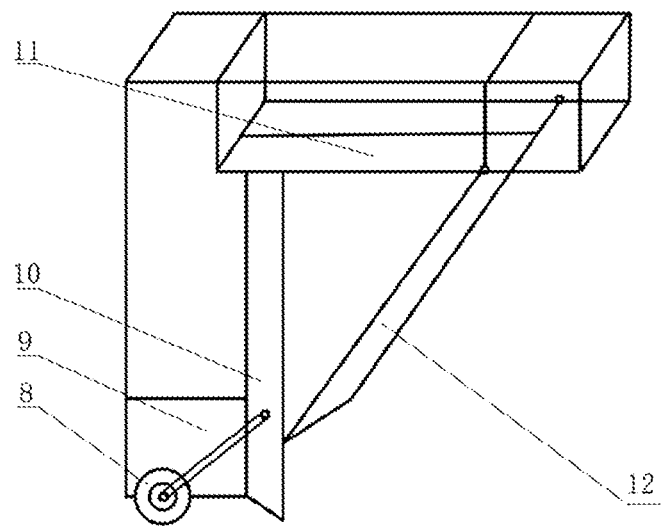
FIG. 2 is a perspective view of a sand paving apparatus.

As shown in FIG. 1 and FIG. 2, an interlayer pre-cooling apparatus for sand mold freezing printing is disclosed in this embodiment; a vacuum feeding apparatus 1 is located above the sand paving apparatus 3 and is connected to a sand mixing apparatus 2, so that raw sand is fed into the sand mixing apparatus from a sand storage tank. A sand blocking plate and a return spring are arranged below the sand mixing apparatus. When the amount of molding sand in a sand paving groove is relatively low, a motor drives the sand paving groove to push the sand blocking plate under the sand mixing apparatus, and the molding sand flows into the sand paving groove; when the outflow amount meets the usage amount of the sand paving apparatus, the sand paving groove leaves a baffle, the baffle rebounds, and the sand outlet is closed. The sand paving apparatus 3 is located on a three-dimensional motion system 7, including a plurality of sand paving grooves 11 with independent opening and closing and an openable and closable baffle 12, and the sand paving apparatus is used for paving low temperature premixed sand on demand. A negative-pressure low-temperature forming chamber 5 is used to enable the molding sand to be in an environment of negative pressure and low temperature during the sand paving process. The compactness of the molding sand is improved in the negative pressure environment, which is beneficial to the strength of a final formed casting. The interference of the external environment temperature may be eliminated in the low temperature environment, which helps to freeze pure water binder. As shown in FIG. 2, a sand paving apparatus 3 includes: a hollow sand paving roller 8, a cooling chamber 9, a sand scraping plate 10, a sand paving groove 11, and an openable and closable baffle 12. The sand paving apparatus 3 is controlled by a ball screw and a drive motor. The positioning of the ball screw auxiliary transmission device is accurate and transmission efficiency is high. The drive motor can drive a sand paving device to run in a Y direction, and an internal vibration motor of the sand paving apparatus 3 may prevent deformation and bonding of the premixed molding sand. The openable and closable baffle 12 is located below the sand paving groove 11, and is connected to a spiral drive motor or a rotary cylinder through a rotary pin shaft, so that an opening and closing angle is controlled to perform sand paving on demand.

The sand scraping plate 10 is located beside the openable and closable baffle 12, and is used for scraping the molding sand discharged from the openable and closable baffle once. The hollow sand paving roller 8 and the sand scraping plate 10 are connected through the cooling chamber 9, and are used for secondary scraping and pressure compaction of the molding sand. The inclination angle of the openable and closable baffle 12 is 60°, and the width of the sand outlet is 6 mm, so that the outflow of the molding sand is in an overall flow status, and the flow is uniform and stable, thereby preventing arching. The above described hollow sand paving roller is hollow, and there is a certain amount of dry ice and liquid nitrogen in the cooling chamber, so that surface temperature of the sand paving roller and the sand scraping plate is controlled at −40° C. to −10° C. The cavity wall of the cooling chamber 9 is connected to the hollow sand paving roller 8 and the sand scraping plate 10. The dry ice or liquid nitrogen inside the chamber reduces the surface temperature of the outer wall of the sand paving roller and the sand scraping plate. In the process of sand scraping and compaction, premixed sand is further cooled, thereby achieving an interlayer pre-cooling effect of molding sand paving, and improving the forming precision of a printing nozzle. At the same time, the content not described in detail in the present specification are all the prior art known to those skilled in the art.

The technical means disclosed by the technical solution of the present invention are not limited to these disclosed in the above implementations and further include the technical solution formed by any combination of the above technical features.

What is claimed is:
1. An interlayer pre-cooling apparatus for a sand mold freezing printing comprising: a sand paving apparatus, wherein
   the sand paving apparatus is located above a negative-pressure low-temperature forming chamber, and
   the sand paving apparatus comprises:
      a plurality of independent sand paving grooves,
      a hollow sand paving roller,
      a cooling chamber,
      a sand scraping plate, and
      an openable and closable baffle;
   the openable and closable baffle is rotationally arranged at a discharge port of each of the plurality of independent sand paving grooves, and
   the openable and closable baffle is used for paving low temperature premixed molding sand on demand.
2. The interlayer pre-cooling apparatus for the sand mold freezing printing according to claim 1, wherein the openable and closable baffle is located below the plurality of independent sand paving grooves, and a sand paving is performed on demand by opening and closing the openable and closable baffle under a control of a control system;

the sand scraping plate is arranged beside the openable and closable baffle and is used for once scraping molding sand discharged from the plurality of independent sand paving grooves;

an inner cavity of the hollow sand paving roller is hollow, and the sand scraping plate is connected and fixed to the cooling chamber, wherein the hollow sand paving roller is located in the cooling chamber and an end of the hollow sand paving roller is connected and fixed to the sand scraping plate through a connecting rod, and the hollow sand paving roller is used for a secondary scraping and a pressure compaction of the molding sand.

3. The interlayer pre-cooling apparatus for the sand mold freezing printing according to claim 1, wherein an end of the openable and closable baffle is connected and fixed to the plurality of independent sand paving grooves through a return spring.

4. The interlayer pre-cooling apparatus for the sand mold freezing printing according to claim 1, wherein dry ice and liquid nitrogen are passed into the hollow sand paving roller to control a surface temperature of the hollow sand paving roller at −40° C. to −10° C.

5. The interlayer pre-cooling apparatus for the sand mold freezing printing according to claim 1, wherein dry ice and liquid nitrogen are may be passed into an inner cavity of the cooling chamber.

6. The interlayer pre-cooling apparatus for the sand mold freezing printing according to claim 1, wherein the openable and closable baffle satisfies the low temperature premixed molding sand flows out of a sand outlet smoothly, an inclination angle of the openable and closable baffle is 60°, and a width of the sand outlet is 6 mm.

7. The interlayer pre-cooling apparatus for the sand mold freezing printing according to claim 1, wherein the openable and closable baffle is connected to a spiral drive motor through a rotary pin shaft; or the openable and closable baffle controls an opening and closing angle with a rotary cylinder to perform the sand paving on demand though the rotary pin shaft.

8. The interlayer pre-cooling apparatus for the sand mold freezing printing according to claim 1, wherein a vibration motor is installed in the sand paving apparatus to prevent a deformation and a bonding of the low temperature premixed molding sand.

\* \* \* \* \*